US007415392B2

(12) United States Patent
Smaragdis

(10) Patent No.: US 7,415,392 B2
(45) Date of Patent: Aug. 19, 2008

(54) SYSTEM FOR SEPARATING MULTIPLE SOUND SOURCES FROM MONOPHONIC INPUT WITH NON-NEGATIVE MATRIX FACTOR DECONVOLUTION

(75) Inventor: Paris Smaragdis, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 950 days.

(21) Appl. No.: 10/799,293

(22) Filed: Mar. 12, 2004

(65) Prior Publication Data

US 2005/0222840 A1 Oct. 6, 2005

(51) Int. Cl.
*G06F 15/00* (2006.01)

(52) U.S. Cl. ...................... 702/190; 707/1; 375/240.12; 375/240.24; 382/162; 382/253; 704/204; 704/205

(58) Field of Classification Search ................. 702/190; 704/204, 205, 236, 219; 707/1; 375/240.12, 375/240.24; 382/162, 253
See application file for complete search history.

(56) References Cited

U.S. PATENT DOCUMENTS

| | | | | |
|---|---|---|---|---|
| 6,151,414 | A * | 11/2000 | Lee et al. | 382/253 |
| 6,625,587 | B1 * | 9/2003 | Erten et al. | 706/22 |
| 7,062,419 | B2 * | 6/2006 | Grzeszczuk et al. | 703/2 |
| 2003/0018604 | A1 * | 1/2003 | Franz et al. | 707/1 |
| 2004/0239323 | A1 * | 12/2004 | Taylor et al. | 324/307 |
| 2005/0021333 | A1 * | 1/2005 | Smaragdis | 704/236 |
| 2005/0123053 | A1 * | 6/2005 | Cooper et al. | 375/240.24 |
| 2006/0265210 | A1 * | 11/2006 | Ramakrishnan et al. | 704/205 |
| 2007/0076869 | A1 * | 4/2007 | Mihcak et al. | 380/54 |
| 2007/0133811 | A1 * | 6/2007 | Hashimoto et al. | 381/22 |
| 2007/0230774 | A1 * | 10/2007 | Baqai | 382/162 |

OTHER PUBLICATIONS

Casey, M.A. and A. Westner (2000 ) "Separation of Mixed Audio Sources by Independent Subspace Analysis", in Proceedings of the International Computer Music Conference, Berlin, Germany, Aug. 2000.

Lee, D.D. and H.S. Seung. (1999 "Learning the parts of objects with nonnegative matrix factorization". In Nature, 401:788 791, 1999.

Lee, D.D. and H.S. Seung (2000) "Algorithms for Non-Negative Matrix Factorization". In Neural Information Processing Systems 2000, pp. 556-562.

Smaragdis, P. and J.C. Brown. (2003) "Non-Negative Matrix Factorization for Polyphonic Music Transcription", in IEEE Workshop on Applications of Signal Processing to Audio and Acoustics. New Paltz, NY, Oct. 2003.

* cited by examiner

*Primary Examiner*—Carol S Tsai
(74) *Attorney, Agent, or Firm*—Dirk Brinkman; Clifton D. Mueller; Gene V. Vinokur

(57) ABSTRACT

A method and system separates components in individual signals, such as time series data streams. A single sensor acquires concurrently multiple individual signals. Each individual signal is generated by a different source. An input non-negative matrix representing the individual signals is constructed. The columns of the input non-negative matrix represent features of the individual signals at different instances in time. The input non-negative matrix is factored into a set of non-negative bases matrices and a non-negative weight matrix. The set of bases matrices and the weight matrix represent the individual signals at the different instances of time.

12 Claims, 4 Drawing Sheets

100

200

300

400

SYSTEM FOR SEPARATING MULTIPLE SOUND SOURCES FROM MONOPHONIC INPUT WITH NON-NEGATIVE MATRIX FACTOR DECONVOLUTION

FIELD OF THE INVENTION

The invention relates generally to the field of signal processing and in particular to detecting and separating components of time series signals acquired from multiple sources via a single channel.

BACKGROUND OF THE INVENTION

Non-negative matrix factorization (NMF) has been described as a positive matrix factorization, see Paatero, "Least Squares Formulation of Robust Non-Negative Factor Analysis," Chemometrics and Intelligent Laboratory Systems 37, pp. 23-35, 1997. Since its inception, NMF has been applied successfully in a variety of applications, despite a less than rigorous statistical underpinning.

Lee, et al, in "Learning the parts of objects by non-negative matrix factorization," Nature, Volume 401, pp. 788-791, 1999, describe NMF as an alternative technique for dimensionality reduction. There, non-negativity constraints are enforced during matrix construction in order to determine parts of human faces from a single image.

However, that system is restricted within the spatial confines of a single image. That is, the signal is strictly stationary. It is desired to extend NMF for time series data streams. Then, it would be possible to apply NMF to the problem of source separation for single channel inputs.

Non-Negative Matrix Factorization

The conventional formulation of NMF is defined as follows. Starting with a complex non-negative M×N matrix $V\in\mathfrak{R}^{\geqq 0, M\times N}$, the goal is to approximate the matrix V as a product of two simple non-negative matrices $W\in\mathfrak{R}^{\geqq 0, M\times R}$ and $H\in\mathfrak{R}^{\geqq 0, M\times N}$, where $R\leqq M$, and an error is minimized when the matrix V is reconstructed approximately by W·H.

The error of the reconstruction can be measured using a variety of cost functions. Lee et al., use a cost function:

$$D = \left\| V \otimes \ln\left(\frac{V}{W\cdot H}\right) - V + W\cdot H \right\|_F, \tag{1}$$

where $\|\cdot\|_F$ is the Frobenius norm, and $\otimes$ is the Hadamard product, i.e., an element-wise multiplication. The division is also element-wise.

Lee et al., in "Algorithms for Non-Negative Matrix Factorization," Neural Information Processing Systems 2000, pp. 556-562, 2000, describe an efficient multiplicative update process for optimizing the cost function without a need for constraints to enforce non-negativity:

$$H = H\otimes\frac{W^{\top}\cdot\frac{V}{W\cdot H}}{W^{\top}\cdot 1},\; W = W\otimes\frac{\frac{V}{W\cdot H}\cdot H^{\top}}{1\cdot H^{\top}}, \tag{2}$$

where 1 is an M×N matrix with all its elements set to unity, and the divisions are again element-wise. The variable R corresponds to the number of basis functions to extract. The variable R is usually set to a small number so that the NMF results into a low-rank approximation.

NMF for Sound Object Extraction

It has been shown that sequentially applying principle component analysis (PCA) and independent component analysis (ICA) on magnitude short-time spectra results in decompositions that enable the extraction of multiple sounds from single-channel inputs, see Casey et al., "Separation of Mixed Audio Sources by Independent Subspace Analysis," Proceedings of the International Computer Music Conference, August, 2000, and Smaragdis, "Redundancy Reduction for Computational Audition, a Unifying Approach," Doctoral Dissertation, MAS Dept., Massachusetts Institute of Technology, Cambridge Mass., USA, 2001.

It is desired to provide a similar formulation using NMF.

Consider a sound scene s(t), and its short-time Fourier transform arranged into an M×N matrix:

$$F = DFT\begin{bmatrix} s(t_1) & s(t_2) & & s(t_N) \\ \vdots & \vdots & \cdots & \vdots \\ s(t_1+M-1) & s(t_2+M-1) & & s(t_N+M-1) \end{bmatrix}, \tag{3}$$

where M is a size of the discrete Fourier transform (DFT), and N is a total number of frames processed. Ideally, some window function is applied to the input sound signal to improve the spectral estimation. However, because the window function is not a crucial addition, it is omitted for notational simplicity.

From the matrix $F\in\mathfrak{R}^{M\times R}$, the magnitude of the transform $V=|F|$, i.e., $V\in\mathfrak{R}^{\geqq 0, M\times R}$ can be extracted, and then, the NMF can be applied.

To better understand this operation, consider the plots 100 of a spectrogram 101, spectral bases 102 and corresponding time weights 103 in FIG. 1. The plot 101 on the lower right is the input magnitude spectrogram. The plot 101 represents two sinusoidal signals with randomly gated amplitudes. Note, that the signals are from a single source, or monophonic signal.

The two columns of the matrix W 102, interpreted as spectral bases, are shown in the lower left. The rows of H 103, depicted in the top, are the time weights corresponding to the two spectral bases of the matrix W. There is one row of weights for each column of bases.

It can be seen that this spectrogram defines an acoustic scene that is composed of sinusoids of two frequencies 'beeping' in and out in some random manner. By applying a two-component NMF to this signal, the two factors W and H can be obtained as shown in FIG. 1.

The two columns of W, shown in the lower left plot 102, only have energy at the two frequencies that are present in the input spectrogram 101. These two columns can be interpreted as basis functions for the spectra contained in the spectrogram.

Likewise the rows of H, shown in the top plot 103, only have energy at the time points where the two sinusoids have energy. The rows of H can be interpreted as the weights of the spectral bases at each time instance. The bases and the weights have a one-to-one correspondence. The first basis describes the spectrum of one of the sinusoids, and the first weight vector describes the time envelope of the spectrum. Likewise, the second sinusoid is described in both time and frequency by the second bases and second weight vector.

In effect, the spectrogram of FIG. 1 provides a rudimentary description of the input sound scene. Although the example in FIG. 1 is simplistic, the general method is powerful enough to dissect even a piece of complex piano music to a set of weights and spectral bases describing each note played and its position in time for that note, effectively performing musical transcription, see Smaragdis et al., "Non-Negative Matrix Factorization for Polyphonic Music Transcription," IEEE Workshop on Applications of Signal Processing to Audio and Acoustics, October 2003, and U.S. patent application Ser. No. 10/626,456, filed on Jul. 23, 2003, titled "Method and System for Detecting and Temporally Relating Components in Non-Stationary Signals," incorporated herein by reference.

The above described method works well for many audio tasks. However, that method does not take into account relative positions of each spectrum, thereby discarding temporal information. Therefore, it is desired to extend the conventional NMF so that it can be applied to multiple time series data streams so that source separation is possible from single channel input signals.

SUMMARY OF THE INVENTION

The invention provides a non-negative matrix factor deconvolution (NMFD) that can identify signal components with a temporal structure. The method and system according to the invention can be applied to a magnitude spectrum domain to extract multiple sound objects from a single channel auditory scene.

A method and system separates components in individual signals, such as time series data streams.

A single sensor acquires concurrently multiple individual signals. Each individual signal is generated by a different source.

An input non-negative matrix representing the individual signals is constructed. The columns of the input non-negative matrix represent features of the individual signals at different instances in time.

The input non-negative matrix is factored into a set of non-negative bases matrices and a non-negative weight matrix. The set of bases matrices and the weight matrix represent the plurality of individual signals at the different instances of time.

DETAILED DESCRIPTION OF THE PREFERRED EMBODIMENT

Non-Negative Matrix Factor Deconvolution

Figure 1:
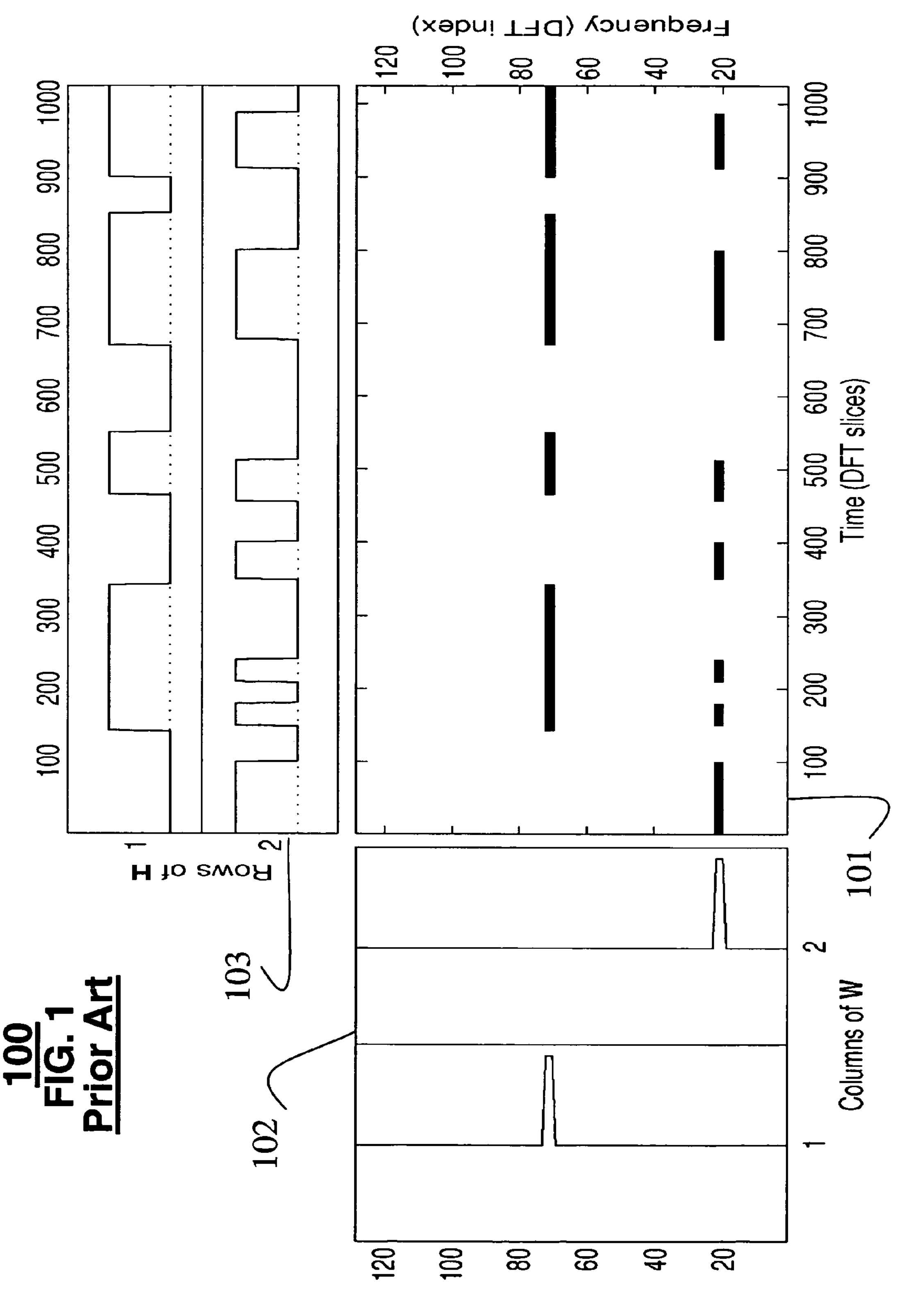
FIG. 1 Prior Art
FIG. 1 are plots of a spectrogram, bases and weights of a non-negative matrix factorization of a sound scene according to the prior art.

The invention provides a method and system that uses a non-negative matrix factor deconvolution (NMFD). Here, deconvolving means 'unrolling' a complex mixture of time series data streams into separate elements. The invention takes into account relative positions of each spectrum in a complex input signal from a single channel. This way multiple signal sources of time series data streams can be separated from a single input channel.

In the prior art, the model used is V=W·H. The invention extends this model to:

$$V \approx \sum_{t=0}^{T-1} W_t \cdot \overset{t\rightarrow}{H}, \tag{4}$$

where an input matrix $V \in \mathfrak{R}^{\geq 0, M \times N}$ is decomposed to a set of non-negative bases matrices $W_t \in \mathfrak{R}^{\geq 0, M \times R}$ and a non-negative weight matrix $H \in \mathfrak{R}^{\geq 0, M \times N}$, over successive time intervals. The operator $$\overset{t\rightarrow}{(\cdot)}$$

shifts the columns of the matrix H by i time increments to the right, for example $$A = \begin{bmatrix} 1 & 2 & 3 & 4 \\ 5 & 6 & 7 & 8 \end{bmatrix}, \overset{0\rightarrow}{A} = \begin{bmatrix} 1 & 2 & 3 & 4 \\ 5 & 6 & 7 & 8 \end{bmatrix},$$
$$\overset{1\rightarrow}{A} = \begin{bmatrix} 0 & 1 & 2 & 3 \\ 0 & 5 & 6 & 7 \end{bmatrix}, \overset{2\rightarrow}{A} = \begin{bmatrix} 0 & 0 & 1 & 2 \\ 0 & 0 & 5 & 6 \end{bmatrix}, \ldots . \tag{5}$$

The left most columns of the matrix H are appropriately set to zero to maintain the original size of the input matrix. Likewise, an inverse operation $$\overset{\leftarrow t}{(\cdot)}$$

shifts columns of the weight matrix H to the left by i time increments.

The objective is to determine sets of bases matrices $W_t$ and the weight matrix H to approximate the input matrix V representing the input signal as best as possible.

Cost Function to Measure Error of Reconstruction A value Λ is set $$\sum_{t=0}^{T-1} W_t \cdot \overset{t\rightarrow}{H},$$

and a cost function to measure an error of the reconstruction is defined as $$D = \left\| V \otimes \ln\left(\frac{V}{\Lambda}\right) - V + \Lambda \right\|_F . \tag{6}$$

In contrast with the prior art, where Λ=W·H, using a similar notation, the invention has to optimize more than two matrices over multiple time intervals to optimize the cost function.

To update the cost function for each iteration of t, the columns are shifted to appropriately line up the arguments according to:

$$H = H \otimes \frac{W_t^{\top} \cdot \left[\overset{\leftarrow t}{\frac{V}{\Lambda}}\right]}{W_t^{\top} \cdot 1} \text{ and } W_t = W_t \otimes \frac{\frac{V}{\Lambda} \cdot \overset{t\rightarrow}{H}^{\top}}{1 \cdot \overset{t\rightarrow}{H}^{\top}}, \forall t \in [0 \ldots T-1]. \tag{7}$$

In every iteration for each time interval t, the matrix H and each matrix $W_t$ is updated. That way, the factors can be updated in parallel and account for their interaction. In complex cases it is often useful to average the updates of the matrix H over all time intervals t. Due to the rapid convergence properties of the multiplicative rules, there is the danger that the matrix H is influenced by the previous matrix $W_t$ used for its update, rather than the entire set of matrices $W_t$.

Example Deconvolution

Figure 2:
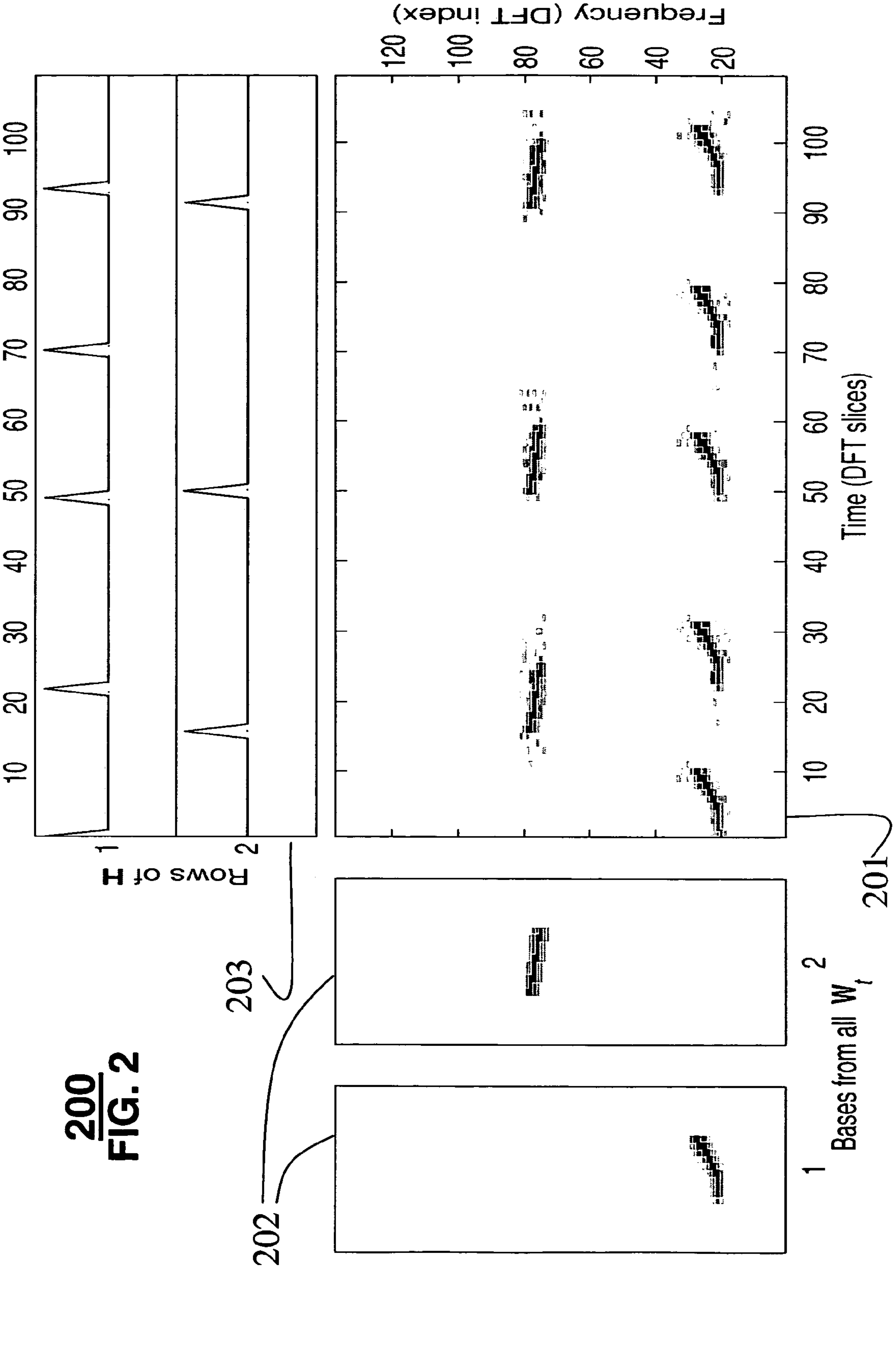
FIG. 2 are plots of a spectrogram, bases and weights of a non-negative matrix factor deconvolution of a sound scene according to the invention.

To gain some intuition on the form of the factors $W_t$ and H, consider the plots in FIG. 2, which shows and extracted NMFD bases and weights. The lower right plot 201 is a magnitude spectrogram that is used as an input to NMFD method according to the invention. Note, that signals vary over time, are generated by multiple sources, and are acquired via a single channel.

The two lower left plots 202 are derived from the factors $W_t$, and are interpreted as temporal-spectral bases. The rows of the factor H, depicted at the top plot 203, are the time weights corresponding to the two temporal-spectral bases. Note that the lower left plot 202 has been zero-padded from left and right so as to appear in the same scale as the input plot.

Like the example shown for the scene shown in FIG. 1, the spectrogram contains two randomly repeating elements, however, in this case, the elements exhibit a temporal structure, which cannot be expressed by spectral bases spanning a single time interval, as in the prior art.

A two-component NMFD with T=10 is applied. This results into a factor H and $T \times W_t$ matrices of size M×2. The $n^{th}$ column of the $t^{th}$ $W_t$ matrix is the $n^{th}$ basis offset by t increments in the left-to-right dimension, time in this case. In other words, the $W_t$ matrices contain bases that extend in both dimensions of the input. The factor H, like the conventional NMF, holds the weights of these functions. Examining FIG. 2, it can be seen that the bases in the set of factors $W_t$ contain the finer temporal information in the sound patterns, while the factor H localizes the patterns in time.

NMFD for Sound Object Extraction

Using the above formulation of NMFD, a sound segment, which contains a set of drum sounds, can be analyzed. In this example, the drum sounds exhibit some overlap in both time and frequency. The input is sampled at 11.025 Hz and analyzed with 256-point DFTs with an overlap of 128-points. A Hamming window is applied to the input to improve the spectral estimate. The NMFD is performed for three basis functions, each with a time extend of ten DFT frames, i.e., R=3 and T=10.

Figure 3:
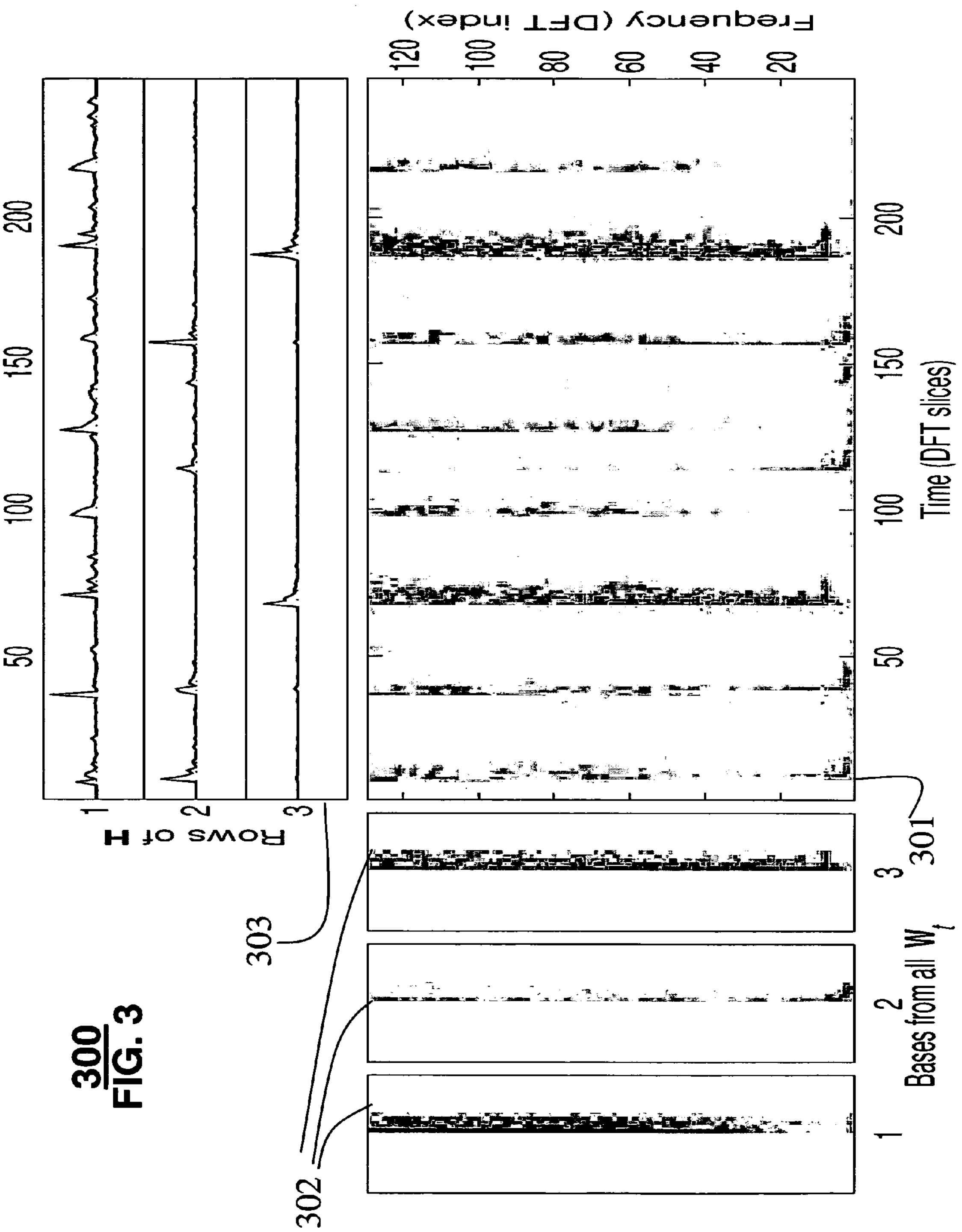
FIG. 3 are plots of a spectrogram, bases and weights of a non-negative matrix factor deconvolution of a sound scene according to the invention.

FIG. 3 shows the spectrogram plot 301, and the corresponding bases and weight factor plots 302-303 for the scene, as before. There are three types of drum sounds present into the scene including four instances of a bass drum sound at low frequencies, two instances of a snare drum sound with two loud wideband bursts, and a 'hi-hat' drum sound with a repeating high-band burst.

The lower right plot 301 is the magnitude spectrogram for the input signal. The three lower left plots 302 are the temporal-spectral bases for the factors $W_t$. Their corresponding weights, which are rows of the factor H, are depicted at the top plot 303. Note how the extracted bases encapsulate the temporal/spectral structure of the three drum sounds in the spectrogram 301.

Upon analysis, a set of spectral/temporal basis functions are extracted from $W_t$. The weights from the factor H show when these bases are placed in time. The bases encapsulated the short-time spectral evolution of each different type of drum sound. For example, the second basis (2) adapts to the bass drum sound structure. Note how the main frequency of this basis decreases over time and is preceded by a wide-band element just like the bass drum sound. Likewise the snare drum basis (3) is wide-band with denser energy at the mid-frequencies, and the hi-hat drum basis (1) is mostly high-band sound.

A reconstruction can be performed to recover the full spectrogram or partial spectrograms for any one of the three input sounds to perform source separation. The partial reconstruction of the input spectrogram is performed using one basis function at a time. For example, to extract the bass drum, which was mapped to the $j^{th}$ basis perform:

$$\hat{V}_j = \sum_{t=0}^{T-1} W_t^{(j)} \cdot \overset{t\rightarrow}{H}, \tag{8}$$

where the $$\overset{t\rightarrow}{(\cdot)}^{(j)}$$

operator selects the $j^{th}$ column of the argument. This yields an output non-negative matrix representing a magnitude spectrogram of just one component of the input signal. This can be applied to original phase of the spectrogram. Inverting the result yields a time series of just, for example, the base drum sound.

Subjectively, the extracted elements consistently sound substantially like the corresponding elements of the input sound scene. That is, the reconstructed base drum sound is like the base drum sound in the input mixture. However, it is very difficult to provide a useful and intuitive quantitative measure that otherwise describes the quality of separation due to various non-linear distortions and lost information, problems inherent in the mixing and the analysis processes.

System Structure and Method

Figure 4:
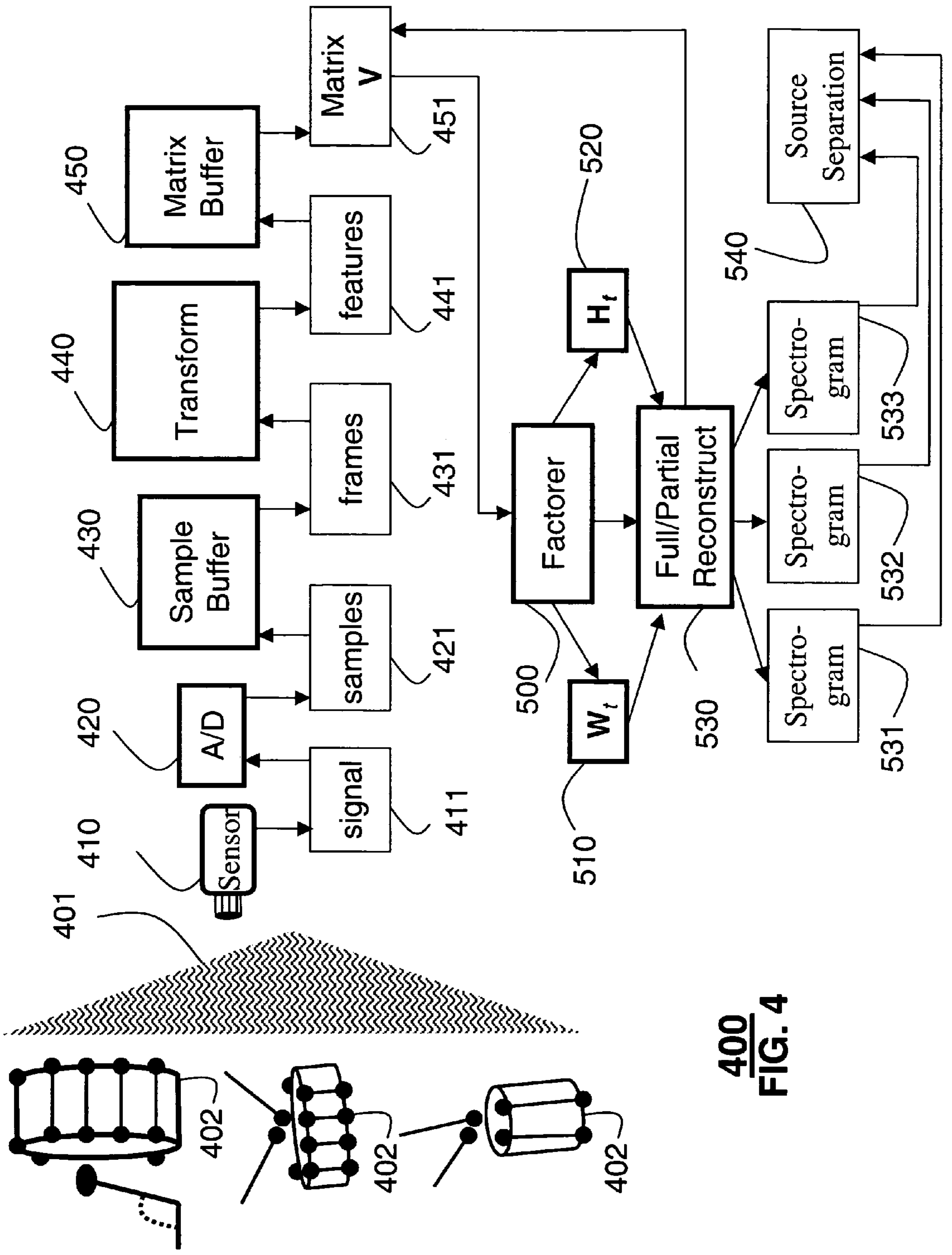
FIG. 4 is a block diagram of a system and method according to the invention.

As shown in FIG. 4, the invention provides a system and method for detecting components of non-stationary, individual signals from multiple sources acquired via a single channel, and determining a temporal relationship among the components of the signals.

The system 400 includes a sensor 410, e.g., microphone, an analog-to digital (A/D) converter 420, a sample buffer 430, a transform 440, a matrix buffer 450, and a deconvolution factorer 500, serially connected to each other.

Multiple acoustic signals 401 are generated concurrently by multiple signal sources 402, for example, three different types of drums. The sensor acquires the signals concurrently. The analog signals 411 are provided by the single sensor 410, and converted 420 to digital samples 421 for the sample buffer 430. The samples are windowed to produce frames 431 for the transform 440, which outputs features 441, e.g., magnitude spectra, to the matrix buffer 450. An input non-negative matrix V 451 representing the magnitude spectra is deconvolutionally factored 500 according to the invention. The factors Wt 510 and H 520 are respectively bases and weights that represent a separation of the multiple acoustic signals 401. A reconstruction 530 can be performed to recover the full spectrogram 451 or partial spectrograms 531-533, i.e., each an output non-negative matrix, for any one of the three input sounds. The output matrices 531-533 can be used to perform source separation 540.

Effect of the Invention

The invention provides a convolutional non-negative matrix factorization. version of NMF that overcomes the problems with the conventional NMF when analyzing temporal patterns. This extension results in an extraction of more expressive basis functions. These basis functions can be used on spectrograms to extract separate sound sources from a sound scenes acquired by a single channel, e.g., one microphone.

Although the example application used to describe the invention uses acoustic signals, it should be understood that the invention can be applied to any time series data stream, i.e., individual signals that were generated by multiple signal sources and acquired via a single input channel, e.g., sonar, ultrasound, seismic, physiological, radio, radar, light and other electrical and electromagnetic signals.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A system separating components in individual signals, comprising:

a single sensor configured to acquire concurrently a plurality of individual signals generated by a plurality of source;

a buffer configured to store an input non-negative matrix representing the plurality of individual signals, the input non-negative matrix including columns representing features of the plurality of individual signals at different instances in time; and means for factoring the first non-negative matrix into a set of non-negative bases matrices and a non-negative weight matrix, the set of bases matrices and the weight matrix representing the plurality of individual signals at the different instances of time.

2. The system of claim 1, in which there is one non-negative bases matrix for each individual signal.

3. The system of claim 1, in which the input non-negative matrix is V, the set of non-negative bases matrices is $W_t$, and the non-negative weight matrix is H such that $$V \approx \sum_{t=0}^{T-1} W_t \cdot \overset{t\rightarrow}{H},$$

where $V \in \mathfrak{R}^{24\ 0,M\times N}$ is the input non-negative matrix to be factored, the set of non-negative bases matrices is $W_t \in \mathfrak{R}^{\geqq 0,M\times R}$, and the non-negative weight matrix is $H \in \mathfrak{R}^{\geqq 0,M\times N}$ over successive time intervals t, and an operator $$\overset{t\rightarrow}{(\cdot)}$$

shifts columns of corresponding matrices by i time increments to the right.

4. The system of claim 3, in which left most corresponding columns of the matrix H are shifted to zero to maintain an new size of the matrix H when the operator $$\overset{\leftarrow t}{(\cdot)}$$

is applied.

5. The system of claim 1, in which the input non-negative matrix is reconstructed from the set of non-negative bases matrices and the non-negative weight matrices.

6. The system of claim 5, in which the reconstructing is according to $$V \approx \sum_{t=0}^{T-1} W_t \cdot \overset{t\rightarrow}{H}.$$

7. The system of claim 6, further comprising;

means for measuring on error of the reconstructing by a cost function $$D = \left\| V \otimes \ln\left(\frac{V}{\Lambda}\right) - V + \Lambda \right\|_F, \text{ where}$$

$$\Lambda = \sum_{t=0}^{T-1} W_t \cdot \overset{t\rightarrow}{H}.$$

8. The system of claim 5, further comprising:

means for updating the cost function for each iteration of t according to $$H = H \otimes \frac{W_t^T \cdot \overset{\leftarrow t}{\left[\frac{V}{\Lambda}\right]}}{W_t^T \cdot 1} \text{ and } W_t = W_t \otimes \frac{\frac{V}{\Lambda} \cdot \overset{t\rightarrow}{H}^T}{1 \cdot \overset{t\rightarrow}{H}^T}, \forall t \in [0 \ldots T-1],$$

where an inverse operation $$\overset{t\rightarrow}{(\cdot)}$$

shifts columns of corresponding matrices to the left by i time increments.

9. The system of claim 5, in which the reconstructing is partial to generate an output non-negative matrix representing a selected one of the plurality of individual signals to perform source separation.

10. The system of claim 1 in which the first non-negative matrix represents a plurality of acoustic signals, each acoustic signal generated by a different source.

11. The system of claim 10, in which columns of the set of non-negative bases matrices columns represent spectral features of the plurality of acoustic signals, and rows of the non-negative weight matrix represent instances in time when the spectral features occur.

12. The system of claim 1, in which the first non-negative matrix represents a plurality of time series data streams.

* * * * *